United States Patent
Fernando et al.

(10) Patent No.: US 12,244,711 B2
(45) Date of Patent: Mar. 4, 2025

(54) SECURE MASSIVELY PARALLEL COMPUTATION FOR DISHONEST MAJORITY

(71) Applicant: NTT Research, Inc., Sunnyvale, CA (US)

(72) Inventors: Rex Fernando, Pittsburgh, PA (US); Ilan Komargodski, Tel Aviv (IL); Runting Shi, Pittsburgh, PA (US)

(73) Assignees: NTT Research, Inc., Sunnyvale, CA (US); Cornell University, Ithaca, NY (US)

( * ) Notice: Subject to any disclaimer, the term of this patent is extended or adjusted under 35 U.S.C. 154(b) by 275 days.

(21) Appl. No.: 18/040,033

(22) PCT Filed: Jul. 29, 2021

(86) PCT No.: PCT/US2021/043770
§ 371 (c)(1),
(2) Date: Jan. 31, 2023

(87) PCT Pub. No.: WO2022/026755
PCT Pub. Date: Feb. 3, 2022

(65) Prior Publication Data
US 2023/0344628 A1 Oct. 26, 2023

Related U.S. Application Data

(60) Provisional application No. 63/059,962, filed on Jul. 31, 2020.

(51) Int. Cl.
*H04L 9/30* (2006.01)
*H04L 9/00* (2022.01)

(52) U.S. Cl.
CPC ............... *H04L 9/30* (2013.01); *H04L 9/008* (2013.01)

(58) Field of Classification Search
CPC ......... G06F 21/64; G06F 21/71; H04L 9/008; H04L 9/30
See application file for complete search history.

(56) References Cited

U.S. PATENT DOCUMENTS

| | | | |
|---|---|---|---|
| 9,774,578 B1 * | 9/2017 | Ateniese | G06F 3/0673 |
| 2016/0149866 A1 * | 5/2016 | Dolev | H04L 9/085 |
| | | | 726/30 |
| 2018/0068280 A1 * | 3/2018 | Micali | G06Q 20/29 |
| 2018/0276417 A1 * | 9/2018 | Cerezo Sanchez | H04L 9/008 |
| 2019/0386814 A1 * | 12/2019 | Ahmed | H04L 9/008 |

(Continued)

OTHER PUBLICATIONS

Chan et al., MPC for MPC: Secure Computation on a Massively Parallel Computing Architecture, 11th Innovations in Theoretical Computer Science Conference, Jan. 2020, 52 pgs.

(Continued)

*Primary Examiner* — Greg C Bengzon
(74) *Attorney, Agent, or Firm* — CipherLaw

(57) ABSTRACT

Systems, methods, network devices, and machine-readable media disclosed herein include executing a secure algorithm for computing on a plurality of machines in a cluster by receiving a large input message and dividing the large input message into a plurality of initial input messages, computing an encryption of initial input messages, and evaluating a cluster computing circuit using a homomorphic encryption scheme.

14 Claims, 6 Drawing Sheets

(56) References Cited

U.S. PATENT DOCUMENTS

| | | | |
|---|---|---|---|
| 2020/0186356 A1* | 6/2020 | Veeningen | H04L 9/008 |
| 2020/0242234 A1* | 7/2020 | Furukawa | G06F 21/6245 |
| 2021/0391987 A1* | 12/2021 | Badrinarayanan | H04L 9/30 |
| 2022/0247551 A1* | 8/2022 | Joye | H04L 9/008 |
| 2023/0188319 A1* | 6/2023 | Froelicher | G06F 21/6245 |
| | | | 713/189 |
| 2023/0396420 A1* | 12/2023 | Badrinarayanan | H04L 9/3247 |
| 2024/0121098 A1* | 4/2024 | Herder, III | H04L 9/3255 |

OTHER PUBLICATIONS

Katz et al., Round Efficiency of Multi-party Computation with a Dishonest Majority, International Conference on the Theory and Applications of Cryptographic Techniques, 2003, (pp. 578-595), 18 pgs.

Koutris et al., Algorithmic Aspects of Parallel Data Processing, 2018, pp. 239-370, 19 pgs.

International Search Report and Written Opinion in PCT/US2021/043770, 7 pgs.

\* cited by examiner

SECURE MASSIVELY PARALLEL COMPUTATION FOR DISHONEST MAJORITY

CROSS-REFERENCE TO RELATED APPLICATIONS

This application is a national stage application, filed under 35 U.S.C. § 371, of International Patent Application No. PCT/US2021/043770, filed Jul. 29, 2021, which claims the benefit of U.S. Provisional Application No. 63/059,962 filed Jul. 31, 2020, the contents of both of which are hereby incorporated in their entireties.

FIELD OF THE INVENTION

The present disclosure relates to systems, methods, network devices, and machine-readable media for secure protocols in the massively parallel computation model.

BACKGROUND OF THE INVENTION

In the past two decades, the model of a sequential algorithm executing on a RAM machine with one processor has become increasingly impractical for large-scale datasets. Indeed, numerous programming paradigms, such as MapReduce, Hadoop, and Spark, have been developed to utilize parallel computation power in order to manipulate and analyze the vast amount of data that is available today. There have been several attempts at formalizing a theoretical model capturing such frameworks. Today the most widely accepted model is called the Massively Parallel Computation (MPC) model.

There is a long line of work studying secure multiparty computation, and a question arises whether these classical results extend to the MPC model. The crucial aspect of algorithms in the MPC model which makes this task non-trivial is the combination of the space constraint with the required small round complexity. Many existing techniques from the standard secure computation literature fail to extend to this model, since they either require too many rounds or they require each party to store too much data. For instance, it is impossible for any one party to store commitments or shares of all other parties' inputs, a common requirement in many secure computation protocols. This also rules out naively adapting protocols that rely on more modern tools such as threshold fully homomorphic encryption, as they also involve a similar first step. Even previous work that focused on large-scale secure computation required one broadcast message per party, which either incurs a large space overhead or a large blowup in the number of rounds.

Prior constructions for secure protocols in this model have some significant limitations in that they only tolerate at most $\approx\frac{1}{3}$ corruptions, and they rely on a trusted setup which must be chosen after the choice of the corrupted parties.

As such, a need exits for the setting of all-but-one corruptions, where the computation is performed in the MPC model but security is required even for a single honest machine if all other players are controlled by an adversary. In the classical secure multi-party computation literature this setting is referred to as the dishonest majority setting and generic protocols tolerating such adversarial behavior are well known. In contrast, in the MPC model, it has not been known that a generic result can be obtained with the space and round complexity constraints. A particularized need exists for a generic way to efficiently compile any massively parallel protocol into a secure version that tolerates all-but-one corruptions.

BRIEF DESCRIPTION OF THE DRAWINGS

The accompanying drawings, which are included to provide further understanding and are incorporated in and constitute a part of this specification, illustrate disclosed embodiments, and together with the description, serve to explain the principles of the disclosed embodiments. In the drawings.

DETAILED DESCRIPTION

Figure 1:
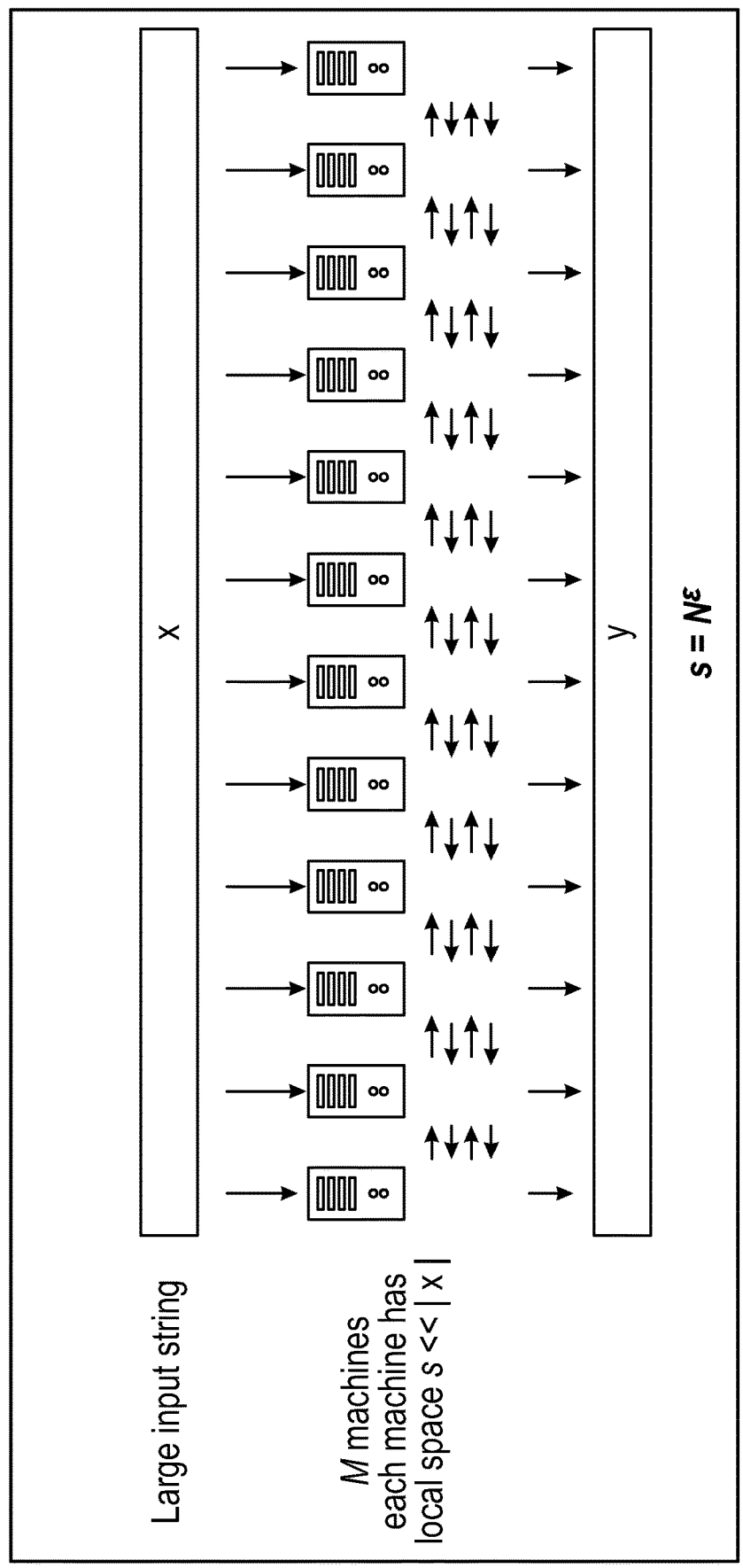
FIG. 1 illustrates an example system for massively parallel computation on a large input string.

The MPC model is believed to best capture large clusters of Random Access Machines (RAM), each with a somewhat considerable amount of local memory and processing power, yet not enough to store the massive amount of available data. For example, such clusters may be operated by large companies such as Google or Facebook. To be more concrete, letting N denote the total number of data records, each machine can only store $s=N^\epsilon$ records locally for some $\epsilon \in (0, 1)$, and the total number of machines is $m \approx N^{1-\epsilon}$ so that they can jointly store the entire data-set. N may be extremely large, possibly tens or hundreds of petabytes, and $\epsilon$ as small, for example 0.2. If N is one Petabyte (106 Gigabytes), then the storage of each machine in the cluster needs to be <16 Gigabytes. In many MPC algorithms it is also acceptable if $m \cdot s = N \cdot \log^c N$ for some constant $c \in \mathbb{N}$ or even $m \cdot s = N^{1+\theta}$ for some small constant $\theta \in (0, 1)$, but not much larger than that.

The primary metric for the complexity of algorithms in this model is their round complexity. Computations that are performed within a machine are essentially "for free". The rule of thumb in this context is that algorithms that require $o(\log_2 N)$ rounds (e.g., $O(1)$ or $O(\log \log N)$) are considered efficient.

The study of secure computation in the MPC model shows that any task that can be efficiently computed in this model can also be securely computed with comparable efficiency. More precisely, any MPC algorithm can be compiled to a secure counterpart that defends against a malicious adversary who controls up to $\frac{1}{3}-\eta$ fraction of machines (for an arbitrarily small constant $\eta$), where the security guarantee is similar to the one in cryptographic secure multiparty computation. In other words, an adversary is prevented from learning anything about the honest parties' inputs except for what the output of the functionality reveals. The cost of this compilation is very small: the compiled protocol only increases the round complexity by a constant factor, and the space required by each machine only increases by a multiplicative factor that is a fixed polynomial in the security parameter. Since round complexity is so important in the MPC setting, it is crucial that these cost blowups are small. Indeed, any useful compiler must preserve even a sublogarithmic round complexity. The security of their construction relies on the Learning With Errors (LWE) assumption and they further rely on the existence of a common random string that is chosen after the adversary commits to its corrupted set.

Disclosed herein are compilers that can be used to efficiently compile any algorithm in the MPC model into an algorithm that implements the same functionality also in the MPC model, but now secure even in the presence of an attacker who controls up to m−1 of the m machines. The protocols handle semi-honest attackers who are assumed to follow the specification of the protocol.

In terms of trusted setup, the protocols we assume that there is a public-key infrastructure (PKI) which consists of a (pk, $sk_1$, . . . , $sk_m$): a single public key and m secret keys, one per machine. Machine i∈[m] knows pk and $sk_i$, whose size is independent of N (and none of the other secret keys). In some embodiments, the protocols allow the adversary to choose the corrupted parties based on the setup phase, a further improvement over prior art systems, for which there is an obvious and devastating attack if the adversary can choose corrupted parties based on the common random string.

Notation and Parameters

With reference to FIG. 1, the embodiments of the invention can be configured to operate on a large input string, distribute portions of this input string to multiple individual machines, which then perform operations on those portions in a series of rounds. The results of those operations from individual machines are then combined into a final output.

Let N denote the bit size of the data-set. We assume for simplicity that a data record takes up one bit. Further suppose that each machine has space $s=N^\epsilon$ for some fixed constant $\epsilon \in (0, 1)$. We further assume that the number of machines, m, is about $N^{1-\epsilon}$ or even a little bigger. The security parameter is denoted λ and it is assumed that $N \leq \lambda^c$ for some $c \in \mathbb{N}$ and s>λ.

Secure MPC With Short Outputs

Some embodiments comprise a compiler that fits best for tasks whose output is short. As a non-limiting example, short may mean that it fits into the memory of, for example, a single machine. The compiler blows up the number of rounds by a constant and the space by a fixed polynomial in the security parameter. For security, we rely on the LWE assumption.

This compiler is not restricted in the class of algorithms it supports, and there are many important and central functionalities that fit in this class. For instance, this class contains all graph problems whose output is somewhat succinct (such as finding a shortest path in a graph, a minimum spanning tree, a small enough connected component, etc). Additionally, all submodular maximization problems, a class of problems that captures a wide variety of problems in machine learning, fit into this class.

Summary of Secure MPC for Short Output

Assume hardness of LWE. Given any massively parallel computation (MPC) protocol Π which after R rounds results in an output of size ≤s for party 1 and no output for any other party, there is a secure MPC algorithm $\tilde{\Pi}$ that securely realizes Π with semi-honest security in the presence of an adversary that statically corrupts up to m−1 parties. Moreover, $\tilde{\Pi}$ completes in O(R) rounds, consumes at most O(s)·poly(λ) space per machine, and incurs O(m·s)·poly(λ) total communication per round.

As mentioned above, by security we mean an analogue of standard cryptographic multiparty computation security, adapted to the massively parallel computation (MPC) model. We use the LWE assumption to instantiate a secure variant of an n-out-of-n threshold fully-homomorphic scheme (TFHE) which supports incremental decoding. This is an alternative to the standard decoding procedure of TFHE schemes which is suited to work in the MPC model, as described in more detail below.

The construction disclosed herein satisfies semi-honest security where the attacker gets to choose its corrupted set before the protocol begins but after the public key is published. In comparison, prior art constructions had their attacker commit on its corrupted set before even seeing the common reference string.

Secure MPC With Long Outputs

Some embodiments can be configured to work for any protocol in the MPC model. Many MPC protocols perform tasks whose output is much larger than what fits into one machine. Such tasks may include, for example, the task of sorting the input. Here the result of the protocol is that each machine contains a small piece of the output, which is considered to be the concatenation of all machines' outputs in order. These compilers can be used for such functionalities.

In this construction we rely, in addition to LWE, on a circular secure variant of the threshold FHE scheme from the short output protocol and also on indistinguishability obfuscation. The compiler achieves the same round and space blowup as the short-output compiler.

Summary of Secure MPC With Long Outputs

Assume the existence of a circular secure n-out-of-n threshold FHE scheme with incremental decoding, along with iO and hardness of LWE. Given any massively parallel computation (MPC) protocol Π that completes in R rounds, there is a secure MPC algorithm $\tilde{\Pi}$ that securely realizes Π with semi-honest security in the presence of an adversary that statically corrupts up to m−1 parties. Moreover, $\tilde{\Pi}$ completes in O(R) rounds, consumes at most O(s)·poly(λ) space per machine, and incurs O(m·s)·poly(λ) total communication per round.

Summary of Protocols

In an example implementation, the total input size contains N bits and there are about $m \approx N^{1-\epsilon}$ machines, each having space $s=N^\epsilon$. In every round, each machine can send and receive at most s bits since its local space is bounded (e.g., a machine cannot broadcast a message to everyone in one round). We are given some protocol in the MPC model that computes some functionality $f: (\{0, 1\}^{l_{in}})^m \rightarrow (\{0, 1\}^s)^m$, where $l_{in} \leq s$, and we would like to compile it into a secure version that computes the same functionality. We would like to preserve the round complexity up to constant blowup, and to preserve the space complexity as much as possible. Moreover, we want semi-honest security, which means there must exist a simulator which, without the honest parties' inputs, can simulate the view of a set of corrupted parties, provided the parties do not deviate from the specification of the protocol.

Since our goal is to use cryptographic assumptions to achieve security for MPC protocols, we introduce an additional parameter $\lambda$, which is a security parameter. One should assume that N is upper bounded by some large polynomial in $\lambda$ and that s is large enough to store $O(\lambda)$ bits.

We first note that we can start by assuming that the communication patterns, i.e., the number of messages sent by each party, the size of messages, and the recipients, do not leak anything about the parties' inputs. We call a protocol that achieves this communication oblivious.

Embodiments for short output protocols can be used where the underlying MPC results with a "short" output, meaning that it fits into the memory of a single machine (for example, the first one).

These embodiments can be configured to execute an encrypted version of the (insecure) MPC algorithm using a homomorphic encryption scheme. To this end, some embodiments include a joint decryption protocol that splits the process of "combining" partial decryption into multiple rounds (concretely, $\log_\lambda m \in O(1)$ rounds). Example embodiments can be configured to use additive-secret-sharing threshold FHE schemes and modify their decryption procedure.

Public Key Infrastructure

Some embodiments can be configured to use a public-key infrastructure (PKI); a trusted party must generate a (single) public key and (many) secret key shares which it distributes to each machine. This is not necessary in all configurations.

Protocol Preliminaries

For $x \in \{0, 1\}^*$, let $x[a:b]$ be the substring of x starting at a and ending at b. A function negl: $\mathbb{N} \to \mathbb{R}$ is negligible if it is asymptotically smaller than any inverse-polynomial function, namely, for every constant $c>0$ there exists an integer $N_c$ such that $\mathrm{negl}(\lambda) \leq \lambda^{-c}$ for all $\lambda > N_c$. Two sequences of random variables $X = \{X_\lambda\}_{\lambda \in \mathbb{N}}$ and $Y = \{Y_\lambda\}_{\lambda \in \mathbb{N}}$ are computationally indistinguishable if for any non-uniform PPT algorithm $\mathcal{A}$ there exists a negligible function negl such that $|\Pr[\mathcal{A}(1^\lambda, X_\lambda)=1] - \Pr[\mathcal{A}(1^\lambda, Y_\lambda)=1]| \leq \mathrm{negl}(\lambda)$ for all $\lambda \in \mathbb{N}$.

Threshold FHE With Incremental Decryption

Some embodiments can be configured to use a threshold FHE scheme with an "incremental" decryption procedure, specialized for the MPC model.

An n-out-of-n threshold fully homomorphic encryption scheme with incremental decryption is a tuple (TFHE.Setup, TFHE.Enc, TFHE.Eval, TFHE.Dec, TFHE.PartDec, TFHE.CombineParts, TFHE.Round) of algorithms which satisfy the following properties:

A) TFHE.Setup($1^\lambda$, n) → (pk, $sk_1$, ..., $sk_n$): On input the security parameter $\lambda$ and the number of parties n, the setup algorithm outputs a public key and a set of secret key shares.

B) TFHE.Enc$_{pk}$(m) → ct: On input a public key pk and a plaintext m $\in \{0, 1\}^*$, the encryption algorithm outputs a ciphertext ct.

C) TFHE.Eval(C, $ct_1$, ..., $ct_k$) → ĉt: On input a public key pk, a circuit C: $\{0, 1\}^{l_1} \times \ldots \times \{0, 1\}^{l_k} \to \{0, 1\}^{l_o}$, and a set of ciphertexts $ct_1$, ..., $ct_k$, the evaluation algorithm outputs a ciphertext ĉt.

D) TFHE.Dec$_{sk}$(ct) → m: On input the master secret key $sk_1 + \ldots + sk_n$ and a ciphertext ct, the decryption algorithm outputs the plaintext m.

E) TFHE.PartDec$_{sk_i}$(ct) → $p_i$: a ciphertext ct and a secret key share $sk_i$, the partial decryption algorithm outputs a partial decryption $p_i$ for party $P_i$.

F) TFHE.CombineParts($p_I$, $p_J$) → $p_{I \cup J}$: On input two partial decryptions $p_I$ and $p_J$, the combine algorithm outputs another partial decryption algorithm $p_{I \cup J}$.

G) TFHE.Round(p) → m: On input a partial decryption p, the rounding algorithm outputs a plaintext m.

Compactness of Ciphertexts

There exists a polynomial p such that $|ct| \leq \mathrm{poly}(\lambda) \cdot |m|$ for any ciphertext ct generated from the algorithms of the TFHE, and $p_i \leq \mathrm{poly}(\lambda) \cdot |m|$ as well for all i.

Correctness With Local Decryption

For all $\lambda$, n, C, $m_1$, ..., $m_k$, the following condition holds. For (pk, $sk_1$, ..., $sk_n$) ← TFHE.Setup($1^\lambda$, n), $ct_i$ ← TFHE.Enc$_{pk}(m_i)$ for i $\in$ [k], ĉt ← TFHE.Eval(C, $ct_i$, ..., $ct_k$), and $p_i$ ← TFHE.PartDec$_{sk_i}$(ĉt), take any binary tree with n leaves labeled with the $p_i$, and with each non-leaf node v labeled with TFHE.CombineParts($p_l$, $p_r$), where $P_l$ is the label of v's left child and $p_r$ is the label of v's right child. Let $\rho$ be the label of the root; then $$\Pr[\mathrm{TFHE.Round}(\rho) = C(m_1, \ldots, m_k)] = 1 - \mathrm{negl}(\lambda).$$

Correctness of MSK Decryption

For all $\lambda$, n, C, $m_1$, ..., $m_k$, the following condition holds. For (pk, $sk_1$, ..., $sk_n$) ← TFHE.Setup($1^\lambda$, n), $ct_i$ ← TFHE.Enc$_{pk}(m_i)$ for i $\in$ [k], ĉt ← TFHE.Eval(C, $ct_1$, ..., $ct_k$), $$\Pr[\mathrm{TFHE.Dec}_{sk}(ĉt) = C(m_1, \ldots, m_k)] = 1 - \mathrm{negl}(\lambda),$$

where sk = $sk_1 + \ldots + sk_n$.

Massively Parallel Computation (MPC) Model

Let N be the input size in bits and $\epsilon \in (0, 1)$ a constant. The MPC model consists of m parties, where m $\in [N^{1-\epsilon}, \mathrm{poly}(N)]$ and each party has a local space of s = $N^\epsilon$ bits. Hence, the total space of all parties is m·s ≥ N bits. Often in the design of MPC algorithms we also want that the total space is not too much larger than N, and thus many works assume that m·s = $\tilde{O}(N)$ or m·s = $O(N^{1+\theta})$ for some small constant $\theta \in (0, 1)$. The m parties are pairwise connected, so every party can send messages to every other party.

With further reference to FIG. 1, protocols in the MPC model can be configured as follows. At the beginning of a protocol, each party receives N/m bits of input, and then the protocol proceeds in rounds. During each round, each party performs some local computation bounded by poly(s), and afterwards may send messages to some other parties through pairwise channels. A well-formed MPC protocol must guarantee that each party sends and receives at most s bits each round, since there is no space to store more messages. After receiving the messages for this round the party appends them to its local state. When the protocol terminates, the result of the computation is written down by all machines, i.e., by concatenating the outputs of all machines. Every machine's output is also constrained to at most s bits. An MPC algorithm may be randomized, in which case every machine has a sequential-access random tape and can read random coins from the random tape. The size of this random tape is not charged to the machine's space consumption.

Communication Obliviousness

In some embodiments, the underlying MPC protocol discussed is communication-oblivious. This means that in each round, the number of messages, the recipients, and the size of each message are determined completely independently of all parties' inputs. That is, there is an efficient algorithm which, given an index i and round number j, outputs the set of parties $P_i$ sends messages to in round j, along with number of bits of each message. In some embodiments, the underlying MPC protocol is given in the form of a set of circuits describing the behavior of each party in each round (one can emulate a RAM program with storage s with a circuit of width O(s)).

Corruption of Parties

In some embodiments of the invention, if a subset of the parties are corrupted, these parties learn nothing from an execution of the protocol beyond their inputs and outputs. Some embodiments may be configured to be consistent with semi-honest security, where all parties follow the protocol specification completely even if they are corrupted. Some embodiments may be configured to work in the PKI model, where we assume there is a trusted party that runs a setup algorithm and distributes a public key and secret keys to each party.

For an MPC protocol Π and a set I of corrupted parties, denote with $\text{view}_I^\Pi(\lambda, \{(x_i, r_i)\}_{i \in [m]})$ the distribution of the view of all parties in I in an execution of Π with inputs $\{(x_i, r_i)\}$. This view contains, for each party $P_i$, $i \in I$, $P_i$'s secret key $sk_i$, inputs $(x_i, r_i)$ to the underlying MPC protocol, the random coins it uses in executing the compiled protocol, and all messages it received from all other parties throughout the protocol. The existence of simulator S, a polynomial-time algorithm which takes the public key and the set I off corrupted parties and generates a view indistinguishable from $\text{view}_I^\Pi(\lambda, \{(x_i, r_i)\}_{i \in [m]})$.

We say that an MPC protocol Π is semi-honest secure in the PKI model if there exists an efficient simulator S such that for all $\{(x_i, r_i)\}_{i \in [m]}$, and all $I \subsetneq [m]$ chosen by an efficient adversary after seeing the public key, $S(\lambda, pk, I\{(x_i, r_i)\}_{i \in I}, \{y_i\}_{i \in I})$ is computationally indistinguishable from $\text{view}_I^\Pi(\lambda, \{(x_i, r_i)\}_{i \in [m]})$.

Note that in this definition we allow the simulator to choose each corrupted party's secret key and the random coins it uses.

Secure MPC for Short Output

Some embodiments assume the hardness of LWE. Suppose that $s=N^\epsilon$ and that m is upper bounded by a fixed polynomial in N. Let λ denote a security parameter, and assume λ≤s and that N≤$\lambda^c$ for some fixed constant c. Given any massively parallel computation (MPC) protocol Π that completes in R rounds where each of the m machines has s local space, and assuming Π results in an output of size $l_{out}$≤s for party 1 and no output for any other party, there is a secure MPC algorithm $\tilde{\Pi}$ in the PKI setting that securely realizes Π with semi-honest security in the presence of an adversary that statically corrupts up to m−1 parties. Moreover, $\tilde{\Pi}$ completes in O(R) rounds, consumes at most O(s)·poly(λ) space per machine, and incurs O(m·s)·poly(λ) total communication per round.

We assume, without loss of generality, the following about the massively parallel computation (MPC) protocol which we will compile:

A) The protocol takes R rounds, and is represented by a family of circuits $\{M_{i,j}\}_{i \in [m], j \in [R]}$, where $M_{i,j}$ denotes the behavior of party $P_i$ in round j. A proof of security can also use the circuit M, the composition of all $M_{i,j}$, which takes in all parties' initial states and outputs the combined output of the protocol.

B) The protocol is communication-oblivious: during round j, each party $P_i$ sends messages to a prescribed number of parties, each of a prescribed number of bits, and that these recipients and message lengths are efficiently computable independent of $P_i$'s state in round j.

C) $M_{i,j}$ takes as input $P_i$'s state $\sigma_{j-1} \in \{0,1\}^{\leq s}$ at the end of round j−1, and outputs $P_i$'s updated state $\sigma_j$. We assume $\sigma_j$ includes $P_i$'s outgoing messages for round j, and that these messages are at a predetermined location in $\sigma_j$. Let MPCMessages(i, j) be an efficient algorithm which produces a set $\{(i', s_{i'}, e_{i'})\}$, where $\sigma[s_{i'}:e_{i'}]$ is the message for $P_{i'}$.

D) At the end of each round j, $P_i$ appends all messages received in round j to the end of $\sigma_j$ in arbitrary order.

E) The parties' input lengths are all $l_{in}$, and the output length is $l_{out}$.

We assume the following about the Threshold FHE (TFHE) scheme:

A) We assume each ciphertext ct has size blowup λ.

B) If ct is a valid ciphertext for message m, then ct[λ·(i−1):λ·i] is a valid ciphertext for the i-th bit of m.

C) We assume the TFHE scheme takes an implicit depth parameter, which we set to the depth of M.

The Protocol

A preferred embodiment of the secure MPC protocol can be configured to proceed in two phases: first, each party encrypts its initial state under pk, and the parties carry out an encrypted version of the original (insecure) MPC protocol using the TFHE evaluation function. Second, $P_1$ distributes the resulting ciphertext, which is an encryption of the output, and all parties compute and combine their partial decryptions so that $P_1$ learns the decrypted output. This second phase relys on the fact that the TFHE scheme partial decryptions can be combined locally in a tree.

A non-limiting example description of the protocol is described below. The protocol may include two subprotocols, distribute and combine, which are described further below.

Setup: Each party $P_i$ knows a public key pk along with a secret key $sk_i$, where (pk, $sk_1, \ldots, sk_m$)←TFHE.Setup($1^\lambda$, m).

Input: Party $P_i$ has input $x_i$ and randomness $r_i$ to the underlying MPC protocol.

Figure 2:
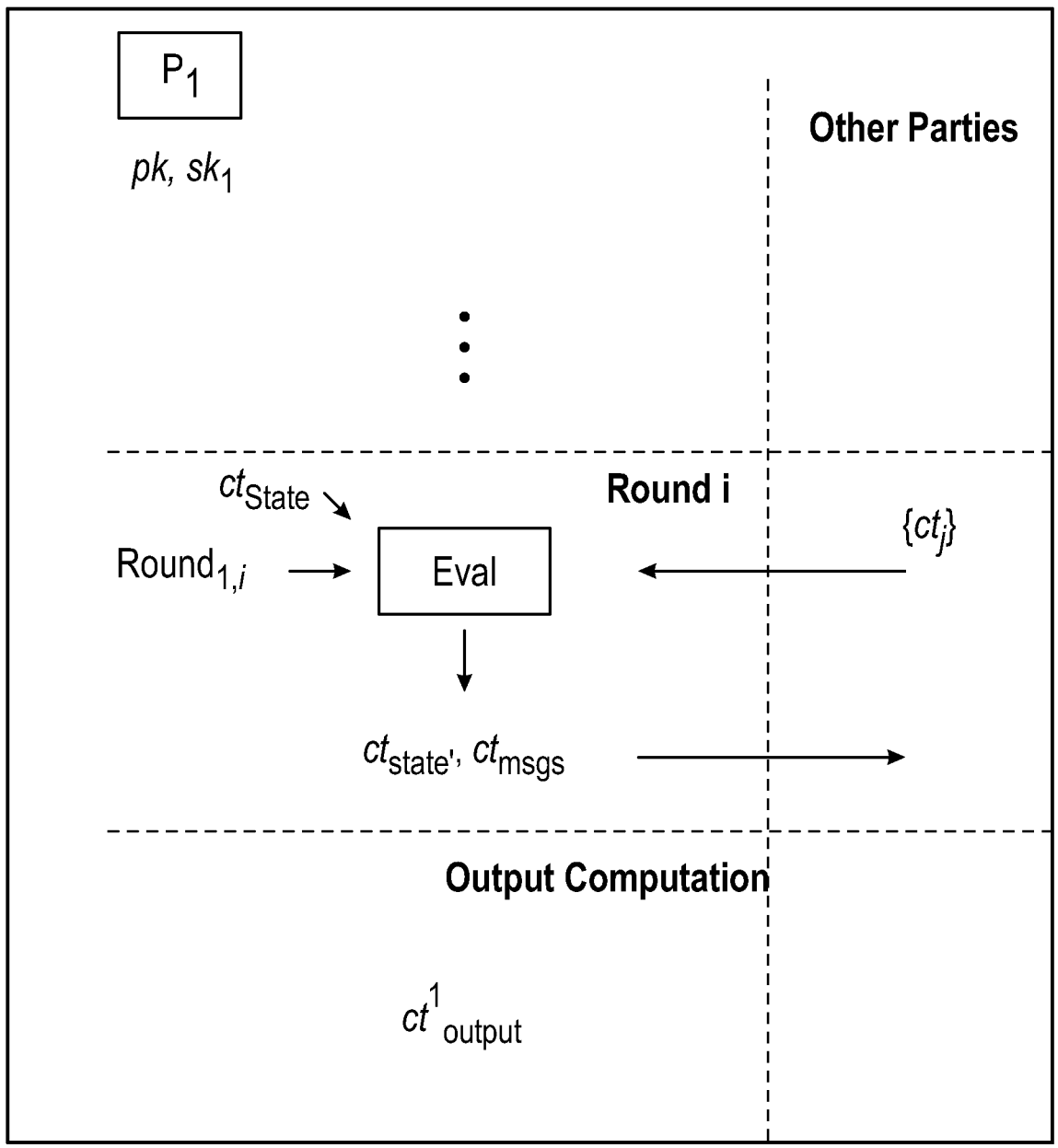
FIG. 2 illustrates an example method for an evaluation phase for secure massively parallel computation.

Encrypted MPC Phase (with reference to FIG. 2): For the first R rounds, the behavior of each party $P_i$ is as follows:

A) Before starting: $P_i$ computes $ct_{\sigma_{i,0}} \leftarrow$ TFHE.$\text{Enc}_{pk}((x_i, r_i))$, its encrypted initial state.

B) During round j: $P_i$ starts with a ciphertext $ct_{o_{i,j-1}}$, and does the following:
   i. Compute $ct_{o_{i,j}} \leftarrow$ TFHE.Eval($M_{i,j}$, $ct_{o_{i,j-1}}$)
   ii. For each (i', $s_i'$, $e_i$)∈MPCMessages(i, j), send $ct_{o_{i,j}}[\lambda \cdot s_i$: $\lambda \cdot e_i]$ to party $P_{i'}$.
   iii. For each encrypted message $ct_m$ received in round j, append to $ct_{o_{i,j}}$.

Figure 3:
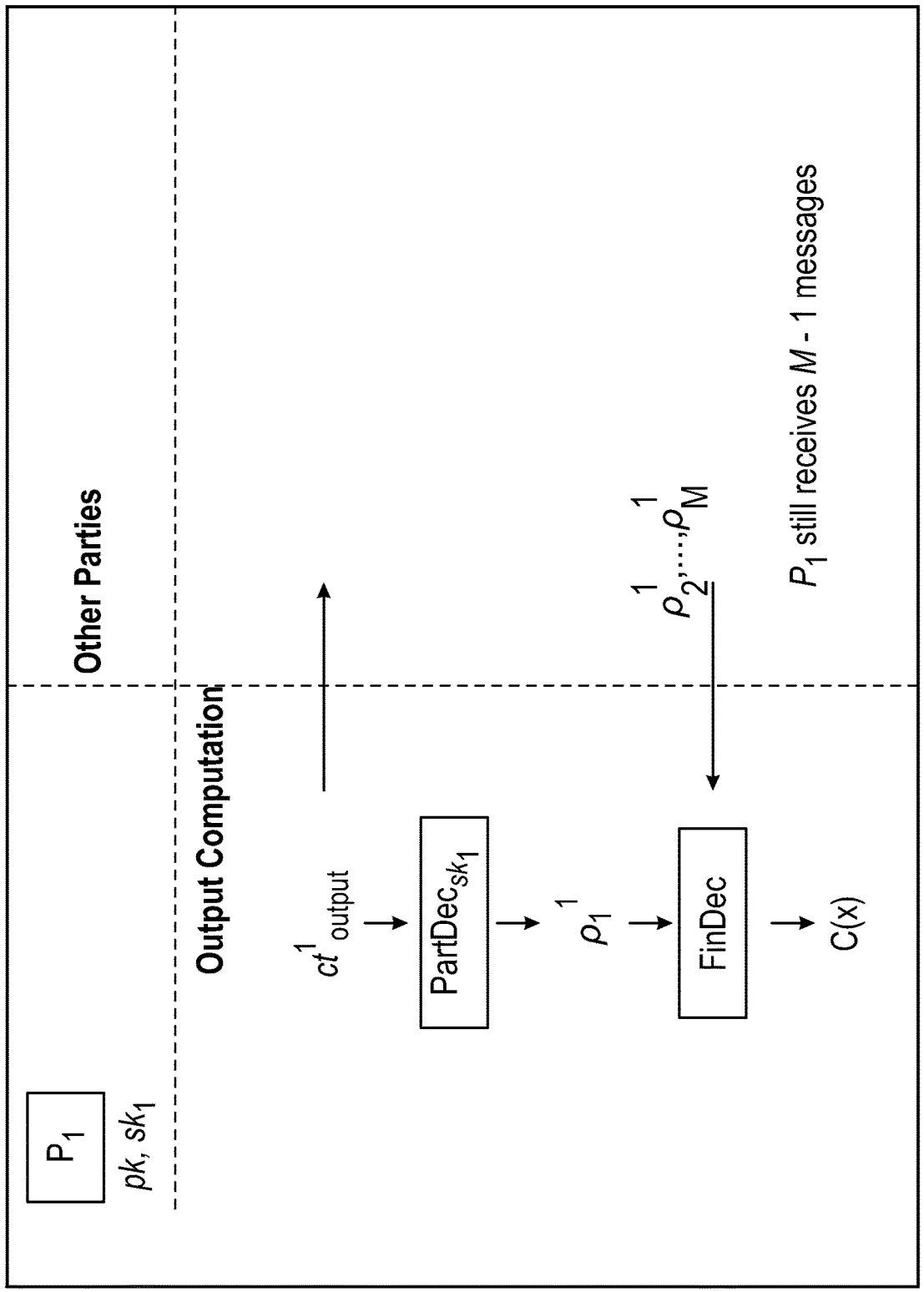
FIG. 3 illustrates an example method for a decryption phase for secure massively parallel computation.

Distributed Output Decryption Phase (with reference to FIG. 3): At the end of the encrypted execution of the MPC protocol, $P_1$'s resulting ciphertext $ct_{o_{1,R}} = ct_o$ is an encryption of the output of the protocol, and the parties do the following:
   (a) All parties: Run Distribute($ct_o$).
   (b) Each party $P_i$: Compute $ct_{o,i} \leftarrow$ TFHE.PartDec$_{sk_i}$($ct_o$).
   (c) All parties: Run Combine(TFHE.CombineParts, $\{c_{o,i}\}_{i \in [m]}$); $P_1$ obtains the resulting $\rho$.
   (d) Output: $P_1$ runs TFHE. Round($\rho$) to obtain a decryption of the output of the underlying MPC protocol.

The Distribute(x) function may be performed as follows:
Parameters: Let the fan-in $f$ be $s/(\lambda|x|)$. Let $t=[\log_f m]$.
Round k: In this round, the parents are all $P_i$ such that $i \equiv 0 \pmod{f^{t-k}}$, and the children are all $P_j$ such that $j \equiv 0 \pmod{f^{t-k+1}}$ but $j \not\equiv 0 \pmod{f^{t-k}}$. Each parent $P_i$ sends x to all its child nodes.

The protocol stops after t rounds. After this point all nodes have x.

Figure 4:
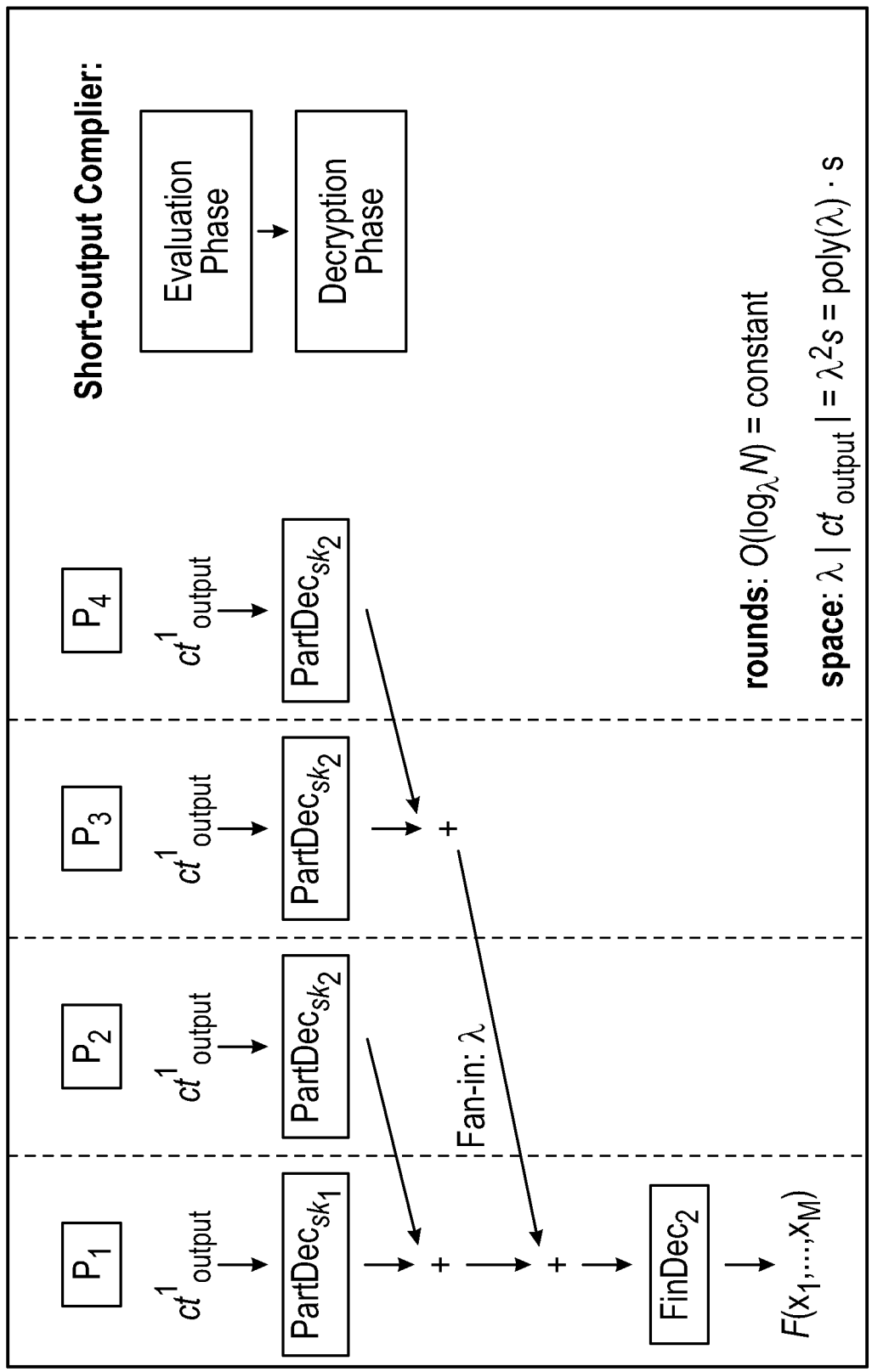
FIG. 4 illustrates an example method for combining partial decryptions to produce a final output.

The Combine(op,$\{x_i\}_{i \in [m]}$) function may be performed as follows (with reference to FIG. 4):
Parameters: Assume op is associative and commutative, $|x_i|=|x_j|$ for all i, j, and that $|x_i \text{op} x_j|=|x_i|=|x_j|$. Let the fan-in $f$ be $s/(\lambda|x|)$.
Start: Each node $P_i$ sets $x_{i,o} \leftarrow x_i$.
Round k: In this round, the parents are all $P_i$ such that $i \equiv 0 \pmod{f^k}$, and the children are all $P_j$ such that $j \equiv 0 \pmod{f^{k-1}}$ but $j \not\equiv 0 \pmod{f^k}$. Each child $P_j$ sends $x_{j,k-1}$ to its parent $P_i$. $P_i$ sets $x_{i,k} \leftarrow x_{j_s k-1}$ op $x_{j_s k-1}$ op . . . op $x_{j_e k-1}$, where $j_s$ is the index of the first child of $P_i$, and $j_e$ is the index of the last child.
End: After $t=[\log_f m]$ rounds, $P_1$ has $x_{1,t} = x_1 \text{op} \ldots \text{op} x_m$.

Hardware Overview

Figure 5:
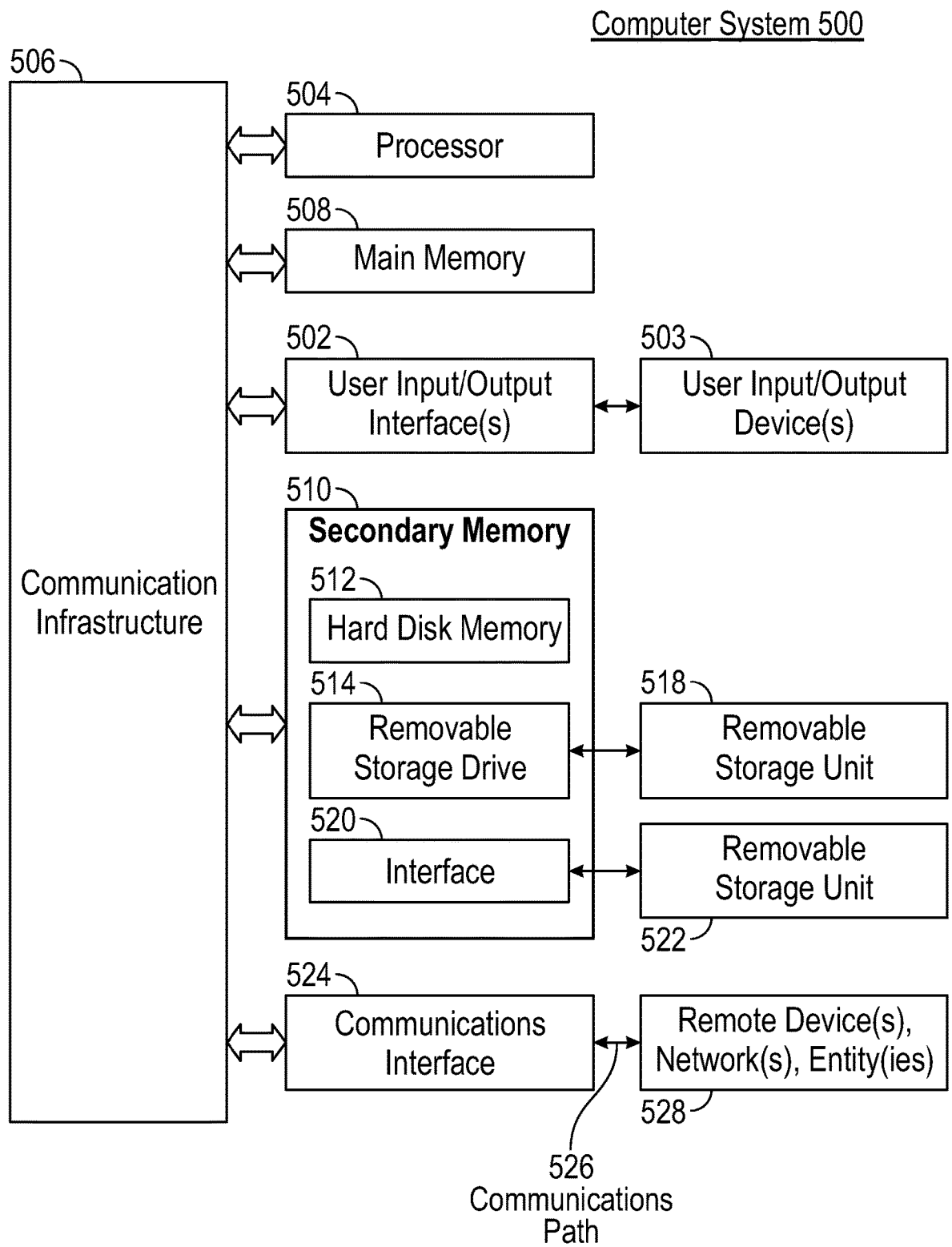
FIG. 5 illustrates an example machine component for implementing systems and methods for secure massively parallel computation.
Figure 6:
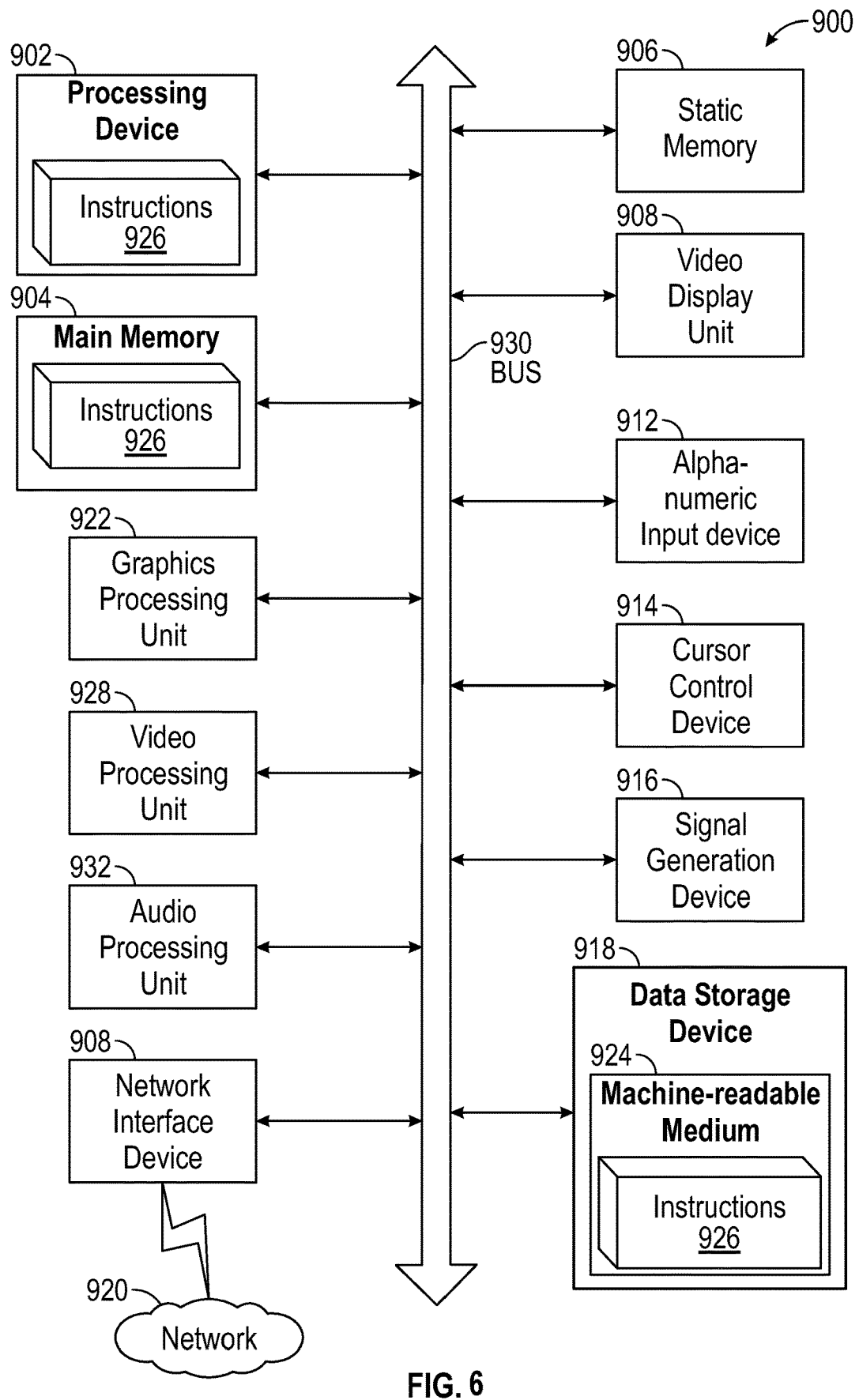
FIG. 6 illustrates further aspects of an example machine component for implementing systems and methods for secure massively parallel computation.

FIGS. 5 and 6 depict example computer systems useful for implementing various embodiments described in the present disclosure. Various embodiments may be implemented, for example, using one or more computer systems, such as computer system 500 shown in FIG. 5. One or more computer system(s) 500 may be used, for example, to implement any of the embodiments discussed herein, as well as combinations and sub-combinations thereof.

Computer system 500 may include one or more processors (also called central processing units, processing devices, or CPUs), such as a processor 504. Processor 504 may be connected to a communication infrastructure 506 (e.g., such as a bus).

Computer system 500 may also include user input/output device(s) 503, such as monitors, keyboards, pointing devices, etc., which may communicate with communication infrastructure 506 through user input/output interface(s) 502. One or more of processors 504 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 500 may also include a main memory 508, such as random-access memory (RAM). Main memory 508 may include one or more levels of cache. Main memory 508 may have stored therein control logic (i.e., computer software, instructions, etc.) and/or data. Computer system 500 may also include one or more secondary storage devices or secondary memory 510. Secondary memory 510 may include, for example, a hard disk drive 512 and/or a removable storage device or removable storage drive 514. Removable storage drive 514 may interact with a removable storage unit 518. Removable storage unit 518 may include a computer-usable or readable storage device having stored thereon computer software (control logic) and/or data. Removable storage drive 514 may read from and/or write to removable storage unit 518.

Secondary memory 510 may include other means, devices, components, instrumentalities, or other approaches for allowing computer programs and/or other instructions and/or data to be accessed by computer system 500. Such means, devices, components, instrumentalities, or other approaches may include, for example, a removable storage unit 522 and an interface 520. Examples of the removable storage unit 522 and the interface 520 may include a program cartridge and cartridge interface, a removable memory chip (such as an EPROM or PROM) and associated socket, a memory stick and USB port, a memory card and associated memory card slot, and/or any other removable storage unit and associated interface.

Computer system 500 may further include communications interface 524 (e.g., network interface). Communications interface 524 may enable computer system 500 to communicate and interact with any combination of external devices, external networks, external entities, etc. (individually and collectively referenced as remote device(s), network(s), entity(ies) 528). For example, communications interface 524 may allow computer system 500 to communicate with external or remote device(s), network(s), entity(ies) 528 over communications path 526, which may be wired and/or wireless (or a combination thereof), and which may include any combination of LANs, WANs, the Internet, etc. Control logic and/or data may be transmitted to and from computer system 500 via communications path 526.

Computer system 500 may also be any of a personal digital assistant (PDA), desktop workstation, laptop or notebook computer, netbook, tablet, smartphone, smartwatch or other wearable devices, appliance, part of the Internet-of-Things, and/or embedded system, to name a few non-limiting examples, or any combination thereof.

Computer system 500 may be a client or server computing device, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

FIG. 6 illustrates an example machine of a computer system 900 within which a set of instructions, for causing the machine to perform any one or more of the operations discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, a specialized application or network security appliance or device, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random-access memory (DRAM) such as synchronous DRAM (SDRAM), etc.), a static memory 906 (e.g., flash memory, static random-access memory (SRAM), etc.), and a data storage device 918, which communicate with each other via a bus 930.

Processing device 902 represents one or more processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 902 may also be one or more special-purpose processing devices such as an application-specific integrated circuit (ASIC), a field-programmable gate array (FPGA), a digital signal processor (DSP), network processor, or the like. The processing device 902 is configured to execute instructions 926 for performing the operations and steps discussed herein.

The computer system 900 may further include a network interface device 908 to communicate over the network 920. The computer system 900 also may include a video display unit 910, an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable medium 924 (also known as a computer-readable storage medium) on which is stored one or more sets of instructions 926 (e.g., software instructions) embodying any one or more of the operations described herein. The instructions 926 may also reside, completely or at least partially, within the main memory 904 and/or within the processing device 902 during execution thereof by the computer system 900, where the main memory 904 and the processing device 902 also constitute machine-readable storage media.

In an example, the instructions 926 include instructions to implement operations and functionality corresponding to the disclosed subject matter. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions 926. The term "machine-readable storage medium" shall also be taken to include any medium that is capable of storing or encoding a set of instructions 926 for execution by the machine and that cause the machine to perform any one or more of the operations of the present disclosure. The term "machine-readable storage medium" shall accordingly be taken to include, but is not be limited to, solid-state memories, optical media, and magnetic media.

Some portions of the detailed description have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, each coupled to a computer system bus.

The operations and illustrations presented herein are not inherently related to any particular computer or other apparatus. Various types of systems may be used with programs in accordance with the teachings herein, or it may prove convenient to construct a more specialized apparatus to perform the operations. The structure for a variety of these systems will appear as set forth in the description herein. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), may cause such data processing devices to operate as described herein.

Based on the teachings contained in this disclosure, it will be apparent to persons skilled in the relevant art(s) how to make and use embodiments of this disclosure using data processing devices, computer systems, and/or computer architectures other than that shown in FIGS. 5 and 6. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible and are within the scope and spirit of this disclosure. For example, and without limiting the generality of this paragraph, embodiments are not limited to the software, hardware, firmware, and/or entities illustrated in the figures described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments but should be defined only in accordance with the following claims and their equivalents. In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

The invention claimed is:

1. A method for executing a secure algorithm for computing on a plurality of machines in a cluster, the method comprising:
   establishing a public key infrastructure, the public key infrastructure further comprising a public key and a plurality of secret keys for a homomorphic encryption scheme, each of the secret keys associated with one of the plurality of machines, wherein the machines each comprise at least one computer processor unit and memory storage unit;
   transmitting the secret keys to the machines with which they are associated;
   receiving a large input message for operation in the plurality of machines and dividing the large input message into a plurality of initial input messages capable of being stored within the memory storage unit of each of the machines;
   transmitting the initial input messages to each machine;
   computing an encryption of an initial state at each machine and the initial input message using the public key;
   evaluating a cluster computing circuit using the homomorphic encryption scheme;
   in a decryption phase, at each machine:
   receiving the ciphertext output from another one of the machines in the cluster as a ciphertext input;
   computing a partial homomorphic decryption of the ciphertext output using the secret key associated with the machine;
   at each machine except for a selected first machine, transmitting the partial decryption to the selected first machine in a tree-like fashion to combine the partial decryptions;
   at the first machine receiving the combined partial decryption; and
   decrypting the combined partial decryptions and storing the combined output on a storage media;
   wherein the cluster computing circuit further comprises a protocol for execution on a plurality of machines and the protocol is configured for computing a pre-defined functionality, and wherein the pre-defined functionality is an output having a size that fits within the memory storage unit of the machine.

2. The method of claim 1, wherein the algorithm is secure against all-but-one of the machines being corrupted or controlled by an adversary.

3. The method of claim 1, wherein the cluster computing circuit is configured to output a trained machine learning model.

4. The method of claim 1, further comprising repeating the decryption phase an arbitrary number of times, wherein the pre-defined functionality is an output having a size that exceeds the memory storage unit of the machine.

5. The method of claim 1, wherein the combining is executed by performing a sum of the partial decryptions.

6. The method of claim 1, wherein the combined partial decryption output can fit within the storage space of a single machine.

7. The method of claim 1, wherein the output of each machine is an encrypted version of an insecure massively parallel computation algorithm using a threshold fully homomorphic encryption scheme.

8. A system for executing a secure algorithm for computing on a plurality of machines in a cluster, the system comprising:
   a processor with computer-executable instructions configured for:
      establishing a public key infrastructure, the public key infrastructure further comprising a public key and a plurality of secret keys for a homomorphic encryption scheme, each of the secret keys associated with one of the plurality of machines, wherein the machines each comprise at least one computer processor unit and memory storage unit;
      transmitting the secret keys to the machines with which they are associated;
   a plurality of machines in a cluster, the machines comprising processors with computer-executable instructions configured for:
      receiving a large input message for operation in the plurality of machines and dividing the large input message into a plurality of initial input messages capable of being stored within the memory storage unit of each of the machines;
      transmitting the initial input messages to each machine;
      computing an encryption of an initial state at each machine and the initial input message using the public key;
      evaluating a cluster computing circuit using the homomorphic encryption scheme;
      in a decryption phase, at each machine:
      receiving the ciphertext output from another one of the machines in the cluster as a ciphertext input;
      computing a partial homomorphic decryption of the ciphertext output using the secret key associated with the machine;
      at each machine except for a selected first machine, transmitting the partial decryption to the selected first machine in a tree-like fashion to combine the partial decryptions;
      at the first machine receiving the combined partial decryption; and
      decrypting the combined partial decryptions and storing the combined output on a storage media;
   wherein the cluster computing circuit further comprises a protocol for execution on a plurality of machines and the protocol is configured for computing a pre-defined functionality, and
   wherein the pre-defined functionality is an output having a size that fits within the memory storage unit of the machine.

9. The system of claim 8, wherein the algorithm is secure against all-but-one of the machines being corrupted or controlled by an adversary.

10. The system of claim 8, wherein the cluster computing circuit is configured to output a trained machine learning model.

11. The system of claim 8, further comprising repeating the decryption phase an arbitrary number of times, wherein the pre-defined functionality is an output having a size that exceeds the memory storage unit of the machine.

12. The system of claim 8, wherein the combining is executed by performing a sum of the partial decryptions.

13. The system of claim 8, wherein the combined partial decryption output can fit within the storage space of a single machine.

14. The system of claim 8, wherein the output of each machine is an encrypted version of an insecure massively parallel computation algorithm using a threshold fully homomorphic encryption scheme.

* * * * *